(12) United States Patent
Zhang

(10) Patent No.: US 11,116,314 B1
(45) Date of Patent: Sep. 14, 2021

(54) METHOD AND SYSTEM FOR HOME CLOTHING AND FOOTWEAR PRODUCTS ARRANGEMENT

(71) Applicant: Zixuan Zhang, Woodland Hils, CA (US)

(72) Inventor: Zixuan Zhang, Woodland Hils, CA (US)

( * ) Notice: Subject to any disclaimer, the term of this patent is extended or adjusted under 35 U.S.C. 154(b) by 0 days.

(21) Appl. No.: 17/103,859

(22) Filed: Nov. 24, 2020

(51) Int. Cl.
| | |
|---|---|
| *A47B 61/00* | (2006.01) |
| *A47B 61/04* | (2006.01) |
| *A47G 25/06* | (2006.01) |
| *G07C 9/00* | (2020.01) |
| *G06K 7/14* | (2006.01) |
| *E05B 65/46* | (2017.01) |
| *G06Q 10/08* | (2012.01) |
| *G06F 16/58* | (2019.01) |

(52) U.S. Cl.
CPC .......... *A47B 61/003* (2013.01); *A47B 61/04* (2013.01); *A47G 25/06* (2013.01); *E05B 65/46* (2013.01); *G06F 16/5866* (2019.01); *G06K 7/1417* (2013.01); *G06Q 10/08* (2013.01); *G07C 9/00896* (2013.01); *G07C 2009/00507* (2013.01); *G07C 2009/00769* (2013.01)

(58) Field of Classification Search
CPC .. G06F 16/5866; G06K 7/1417; G06K 10/08; A47B 61/003; A47B 61/04
See application file for complete search history.

(56) References Cited

U.S. PATENT DOCUMENTS

| | | | |
|---|---|---|---|
| 2005/0067420 A1* | 3/2005 | Diaz | A43D 117/00 221/2 |
| 2018/0060800 A1* | 3/2018 | Robinson | G07C 9/00571 |
| 2018/0173807 A1* | 6/2018 | Prakash | G06Q 10/087 |
| 2019/0362302 A1* | 11/2019 | Deemter | A47J 39/003 |
| 2020/0394857 A1* | 12/2020 | Lin | G07C 9/00182 |

FOREIGN PATENT DOCUMENTS

CN          109998286 A   *   7/2019

* cited by examiner

*Primary Examiner* — Laura A Gudorf
(74) *Attorney, Agent, or Firm* — Raymond Y. Chan; David and Raymond Patent Firm

(57) ABSTRACT

A system for home clothing and footwear products arrangement includes a shelter arrangement which comprises a plurality of shelter elements for storing and sheltering a plurality of dressing items, a control center which is a computing device, an electrical terminal, a position indication arrangement for indicating a position of a target dressing item for a user, and an identifier coupled to the shelter arrangement for establishing communication between the control center and the electrical terminal, so as to allow a user to quickly find his or her target clothing or footwear product.

13 Claims, 14 Drawing Sheets

METHOD AND SYSTEM FOR HOME CLOTHING AND FOOTWEAR PRODUCTS ARRANGEMENT

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a storing and sheltering device for clothing and footwear products, and more particularly to a method and system for home clothing and footwear products arrangement that is adapted for intelligently identifying a target clothing or footwear product for a user.

Description of Related Arts

An wardrobe, or closet, which is a necessary furniture at home, is mainly used to store clothes, shoes, bags, hats, accessories, etc. A conventional wardrobe or closet is generally divided into several areas, which can be used to store different types of clothing or footwear products. Although the different types of clothing or footwear products are stored in different areas, if there are a large number of clothing or footwear products in each area, it is still difficult to find out the target clothing and footwear products you want to wear in the wardrobe. Due to the large number and types of clothing or footwear products, even if the clothing or footwear products in the closet is sorted one by one, it is difficult to remember where the clothing or footwear products are placed. Therefore, it is difficult to find the target clothing or footwear product.

Take shoes as an example. Different shoes of a same owner or multiple owners can be replaceably put into a same shoe cabinet. Shoes of different styles, different colors, and different sizes of one or more owners may be placed randomly in shoe cabinets, so that a user has to memorize the positions of his or her shoes. It is actually a disaster for a user to try to find the one he or she wants to wear among the shoe cabinets. In addition, a cabinet which has been used for storing an old pair of shoes may get dirty that it is actually not suitable for storing a new pair of shoes.

Similarly, when a clothing item is added to or taken out of the wardrobe or closet, the original order of the clothing items in the wardrobe or closet is disrupted, and it is not easy for a user to memorize the positions of the clothes in the wardrobe or closet. Furthermore, a user may have a desire collocation of a clothing dress and a pair of shoes, when he or she finds the desired pair of shoes, it is still time-consuming for he or she to search and find the matched clothing dress for the desired pair of shoes, and when he or she finds the desired clothing, it is also still time-consuming for he or she to search and find the desired pair of shoes.

SUMMARY OF THE PRESENT INVENTION

The invention is advantageous in that it provides a method and system for home clothing and footwear products arrangement that allows a user to quickly find his or her target clothing or footwear product.

Another advantage of the invention is to provide a method and system for home clothing and footwear products arrangement, wherein each shelter element for storing and sheltering the clothing and footwear products is provided with identify information that can be associated with product information of the corresponding clothing or footwear product, so that the system allows the user to use the product information to identify the position of the target clothing or footwear product.

Another advantage of the invention is to provide a method and system for home clothing and footwear products arrangement, wherein when the user may use sound, message, or picture information to search the target clothing or footwear product, the system is able to automatically identify the corresponding shelter element for the target clothing or footwear product.

Another advantage of the invention is to provide a method and system for home clothing and footwear products arrangement, wherein each shelter element for the corresponding footwear products can be configured to automatically open its lid or move out a storing drawer to display the target footwear product for the user.

Another advantage of the invention is to provide a method and system for home clothing and footwear products arrangement, wherein each shelter element for the corresponding clothing product can be configured to automatically transfer the target clothing product to a position available for the user to pick up for wearing.

Another advantage of the invention is to provide a method and system for home clothing and footwear products arrangement, wherein an indicating element such as a lighting indicating element or sound indicating element can be introduced for indicating the position of the target clothing or footwear product for the user.

Another advantage of the invention is to provide a method and system for home clothing and footwear products arrangement, wherein the item information of the clothing products and footwear products can be associated with each other, so as to allow the user to simultaneously find a target clothing product and its collocated target footwear product.

Another advantage of the invention is to provide a method and system for home clothing and footwear products arrangement, wherein when the user inputs product information about one of a target clothing product and a target footwear product, both of the collocated target clothing product and target footwear product are simultaneously identified by the system, so as to save time for the user to find the desired clothing and footwear products for dressing up himself or herself.

Additional advantages and features of the invention will become apparent from the description which follows, and may be realized by means of the instrumentalities and combinations particularly pointing out in the appended claims.

According to the present invention, the foregoing and other objects and advantages are attained by a method of a system for home clothing and footwear products arrangement, wherein the method comprises the following steps.

(a) Provide a shelter arrangement which comprises a plurality of shelter elements for sheltering a plurality of dressing items, wherein each of the plurality of dressing items is one of a clothing product and a footwear product.

(b) Provide an identifier for establishing communication between an electrical terminal and a control center which is a computing device, and by the control center, receiving item information of a target product which is one of a target footwear product and a target clothing product from the electrical terminal.

(c) By the control center, link the item information of the target product with identity information of the shelter element for sheltering the target product.

(d) In response to a request for searching the target product on the electrical terminal, indicate a position of the shelter element for sheltering the target product by a position indication arrangement which is operatively communicated to the control center based on the identity information of the shelter element for sheltering the target product linked with the item information of the target product.

According to another aspect of the present invention, the present invention provides a method of a system for home clothing and footwear products arrangement, wherein the method comprises the following steps.

(A) Provide a first shelter arrangement which comprises a plurality of first shelter elements for sheltering a plurality of footwear products, and provide a second shelter arrangement which comprises a plurality of second shelter elements for sheltering a plurality of clothing products, wherein the first shelter arrangement and the second shelter arrangement are independent with each other.

(B) Provide a first identifier for establishing communication between an electrical terminal and a first control center which is a computing device, and by the first control center, receive item information of a target footwear product and item information of a target clothing product from the electrical terminal.

(C) By the first control center, link the item information of the target footwear product and the item information of the target clothing product with identity information of a first shelter element of the first shelter arrangement for sheltering the target footwear product.

(D) Provide a second identifier for establishing communication between the electrical terminal and a second control center which is a computing device, and by the second control center, receive the item information of the target footwear product and the item information of the target clothing product from the electrical terminal.

(E) By the second control center, link the item information of the target footwear product and the item information of the target clothing product with identity information of a second shelter element of the second shelter arrangement for sheltering the target clothing product.

(F) Indicate a position of the first shelter element by a first position indication arrangement which is operatively communicated to the first control center based on the identity information of the first shelter element linked with the item information of the target footwear product and the item information of the target clothing product.

(G) Indicate a position of the second shelter element by a second position indication arrangement which is operatively communicated to the second control center based on the identity information of the second shelter element linked with the item information of the target footwear product and the item information of the target clothing product.

According to another aspect of the present invention, the present invention provides a system for home clothing and footwear products arrangement, wherein the system comprises a shelter arrangement which comprises a plurality of shelter elements for storing and sheltering a plurality of dressing items, a control center which is a computing device, an electrical terminal and a position indication arrangement for indicating a position of a target dressing item for a user, and an identifier coupled to the shelter arrangement for establishing communication between the control center and the electrical terminal.

According to another aspect of the present invention, the present invention provides a system for home clothing and footwear products arrangement, wherein the system comprises a first shelter arrangement which comprises a plurality of first shelter elements for storing and sheltering a plurality of footwear products, a second shelter arrangement which comprises a plurality of second shelter elements for storing and sheltering a plurality of clothing products, a first control center corresponding to the first shelter arrangement, a second control center corresponding to the second shelter arrangement, a first identifier coupled to the first shelter arrangement, a second identifier coupled to the second shelter arrangement, a first position indication arrangement coupled to the first shelter arrangement, a second position indication arrangement coupled to the second shelter arrangement, and an electrical terminal. The first shelter arrangement and the second shelter arrangement are independent with each other and can be arranged in different places at a house. The system is arranged for finding a set of dressing items comprises a target footwear product and a target clothing product.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
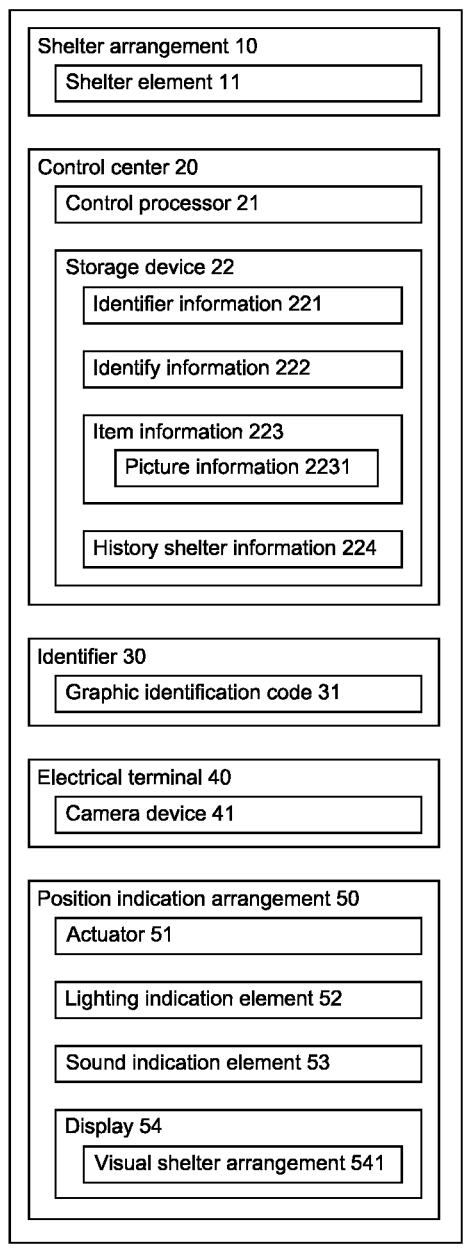
FIG. 1 is a diagram illustrating a system for home clothing and footwear products arrangement according to a first preferred embodiment of the present invention

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1 to 8B of the drawings of the present invention, a system for home clothing and footwear products arrangement according to a first preferred embodiment of the present invention is illustrated. More specifically, the system comprises a shelter arrangement 10 which comprises a plurality of shelter elements 11 for storing and sheltering a plurality of dressing items 100, a control center 20 which is a computing device, an identifier 30 coupled to the shelter arrangement 10, an electrical terminal 40 and a position indication arrangement 50 for indicating a position of a target dressing item 100 for a user. The identifier 30 is arranged for establishing communication between the control center 20 and the electrical terminal 40.

The plurality of dressing items 100 may comprise a plurality of footwear products 101 or a plurality of clothing products 102. According to this embodiment, the plurality of shelter elements 11 of the shelter arrangement 10 comprises a plurality of first shelter elements 11a for storing a plurality of footwear products 101 and a plurality of second shelter elements 11b for sheltering a plurality of clothing products 102.

Each of the first shelter elements 11a of this embodiment can be embodied as a container for storing a corresponding footwear product 101. Accordingly, footwear products 101 of different brands, different styles and different sizes can be separately placed in different first shelter elements 11a. In this embodiment, Each of the second shelter elements 11b also can be embodied as a container for storing a corresponding clothing product 102, so that the clothing products 102 suitable for wearing in different seasons having different brands, different styles and different sizes can be separately placed in different second shelter elements 11b.

Accordingly, the control center 20 comprises a control processor 21, and a storage device 22 which is memory device for storing identifier information 221 of the identifier 30, identity information 222 of each shelter element 11, and item information 223 of the dressing item 100 stored and sheltered at the corresponding shelter element 11.

The identity information 222 of each shelter element 11 may comprise an ID number information, or position information of the corresponding shelter element 11, or a position information of the corresponding shelter element 11. The item information 223 of the dressing item 100 may comprise but not limited to an ID number information of the corresponding dressing item 100, a description information such as brand, size, style information of the corresponding dressing item 100, picture information of the corresponding dressing item 100, an identification voice information of the corresponding dressing item 100.

Figure 2:
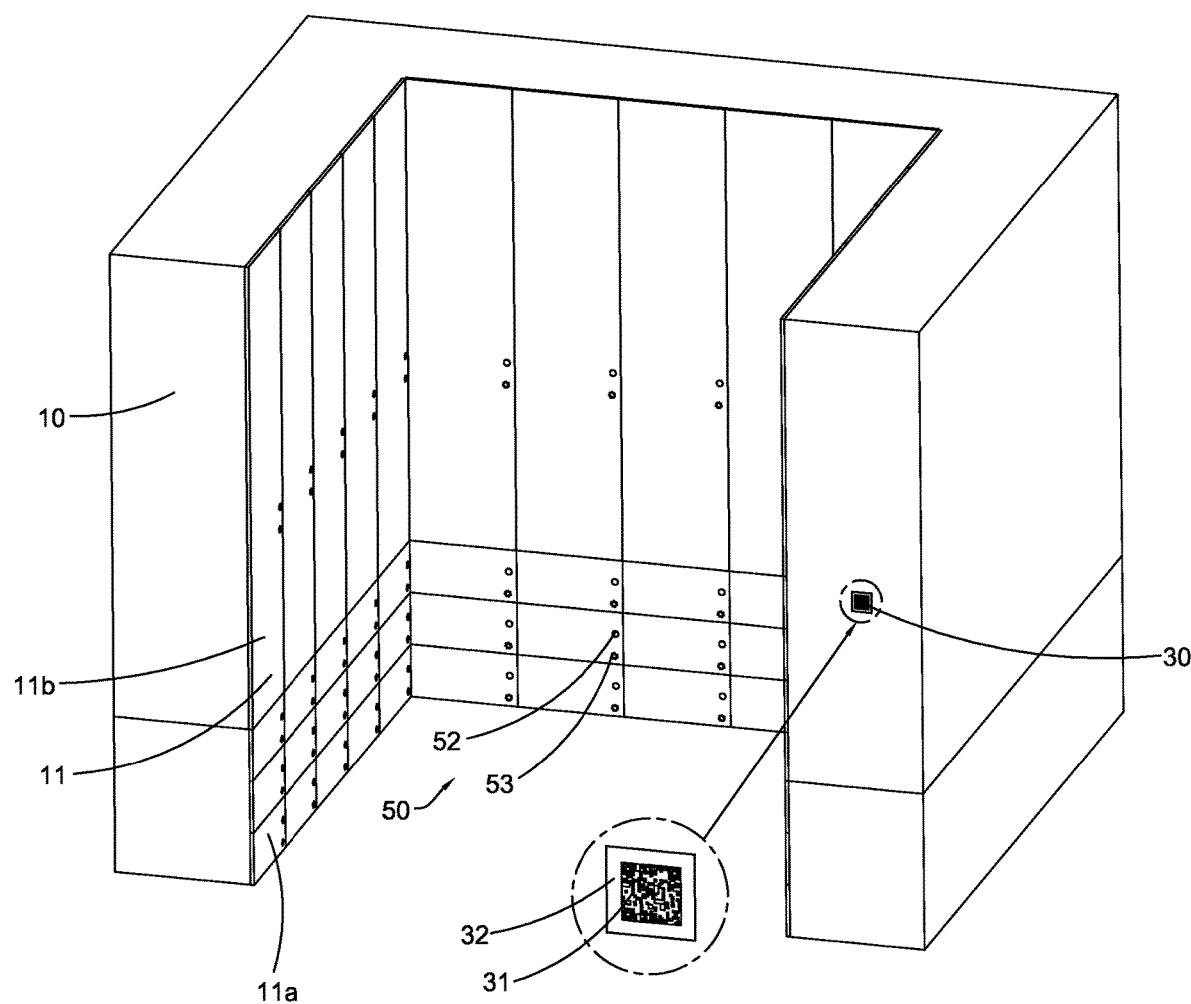
FIG. 2 is a perspective view of a system for home clothing and footwear products arrangement according to the above first preferred embodiment of the present invention.

The identifier 30 can be any suitable identifying element such as a RFID tag and a SIM card. As shown in FIG. 2 of the drawings, according to this embodiment, the identifier 30 can be a graphic identification code 31 such as a QR code and a two-dimensional code. The graphic identification code 31 is attached to the corresponding shelter arrangement 10 Accordingly, the graphic identification code 31 may be formed on an outer surface of the shelter arrangement 10, or the identifier 30 may comprise a carrier 32, and the graphic identification code 31 may be formed on the carrier 32 by painting, and the carrier 32 is attached to the outer surface of the shelter arrangement 10.

Accordingly, the control center 20 of this embodiment can be embodied as a server system while the electronic terminal 40 is a guest terminal which can wirelessly communicate with the control center 20 on a software application. The electronic terminal 40 may be a console for the system of the instant invention, or is a portable electronic device such as a phone, a laptop computer, a tablet computer, and a PDA which is installed with the software application. In addition, multiple uses may use multiple electrical terminals 40 to communicate with the control center 20 respectively.

Figure 3:
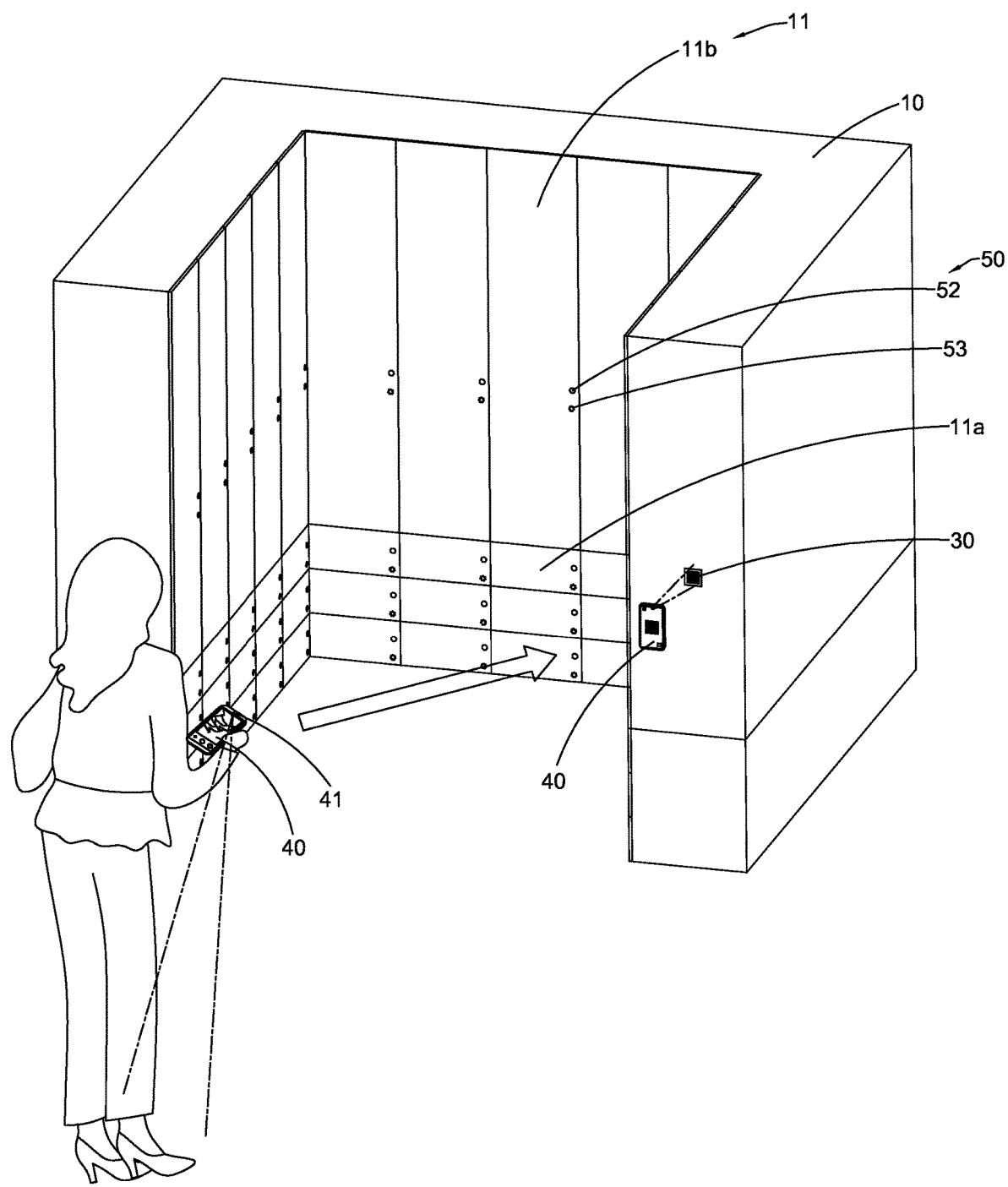
FIG. 3 is a schematic view illustrating a state for putting a footwear product into a shelter element of the system for home clothing and footwear products arrangement according to the above first preferred embodiment of the present invention.
Figure 4:
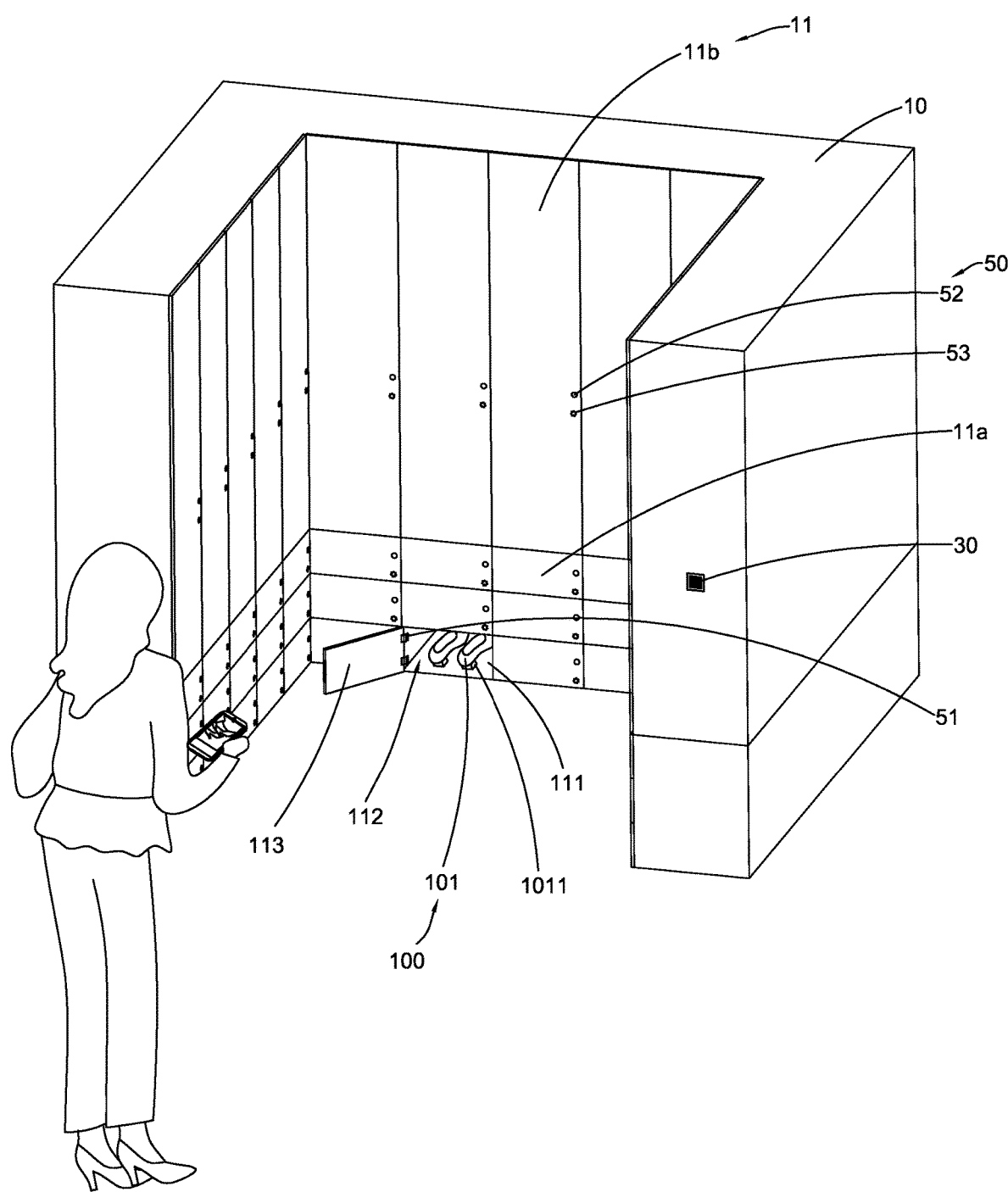
FIG. 4 is a schematic view illustrating a state for indicating a position of the footwear product in a shelter element of the system for home clothing and footwear products arrangement according to the above first preferred embodiment of the present invention.

FIGS. 3 and 4 illustrate a process for putting a target footwear product 1011 into a first shelter element 11a of the system for home clothing and footwear products arrangement and finding the target footwear product 1011 in the first shelter element 11a of the system when the user wants to wear on the target footwear product 1011.

More specifically, as shown in FIG. 3, the electronic terminal 40 comprises a camera device 41 for taking a picture of the target footwear product 1011 to provide picture information 2231 of the item information 223, and then the user can scan the identifier 30 which is a graphic identification code 31 to activate and establish communication between the electronic terminal 40 and the control center 20 for the user to upload the picture information 2231 of the item information 223 of the target footwear product 1011 to the control center 20, and then the picture information 2231 of the item information 223 of the target footwear product 1011 is linked with the identity information 222 of the first shelter element 11a in the control center 20.

As shown in FIG. 4 of the drawings, when the user wants to find the target footwear product 1011, he or she can use the picture of the target footwear product 1011 which is the picture information 2231 of the item information 223 to search the target footwear product 1011 on the electrical terminal 40 on a software application. In other words, the picture of the target footwear product 1011 can be stored in the electronic terminal 40 or in the software application, the user can upload the picture of the target footwear product 1011 in a search toolbar of the software application to request for finding the target footwear product 1011.

Upon receiving the request from the electrical terminal 40, the control center 20 is in operation to indicate a position of the first shelter element 11a of the target footwear product 1011 based on the identity information 222 of the first shelter element 11a linked with the item information 223 of the target footwear product 1011 by activating the position indication arrangement 50.

The position indication arrangement 50 of the present invention is arranged to indicate the position of a target dressing item 30. According to this preferred embodiment, each of the first shelter elements 11a comprises a storing container 111 defining a storing chamber 112 and a lid 113 covered on the receiving container 111, the position indication arrangement 50 comprises a plurality of actuators 51 connected to the control center 20, each actuator 52 is arranged for opening the lid 113 of the corresponding first shelter element 11a which is arranged for storing the target footwear product 1011 which is the target product the user wants to find.

In other words, when the actuator 51 receives the command from the control center 20, the actuator 51 is in operation so as to open the lid 113 by any suitable electrical activating means such as motor activating means, electrical and magnetically activating means, so that the target footwear product 1011 stored in the storing chamber 112 of the first shelter element 11a will be exposed and the user can know the location of the target footwear product 1011, and thus the user is able to take out the target footwear product 1011 from the corresponding first shelter element 11a for wearing.

As shown in FIG. 2 of the drawings, the position indication arrangement 50 may also comprise a plurality of lighting indication elements 52 each emits an indication lighting for indicating the position of the corresponding first shelter element 11a for storing the target footwear product 1011, or a plurality of sound indicating elements 53 each produces an indication sound for indicating the position of the corresponding first shelter element 11a for storing the target footwear product 1011.

According to this embodiment, the item information 223 of the target footwear product 1011 is embodied as the picture information 2231. In an alternative mode, the item information 223 is a voice information recorded from a voice of user describing the target footwear product 1011. During the procedure for finding the target footwear product 1011, the user speaks to the electronic terminal 40 to input a search sound message to retrieve the target footwear product 1011. In another alternative mode, the user may typewrite message which is associated with the target footwear product 1011 on the electronic terminal 40 to search the target footwear product 1011.

Figure 5:
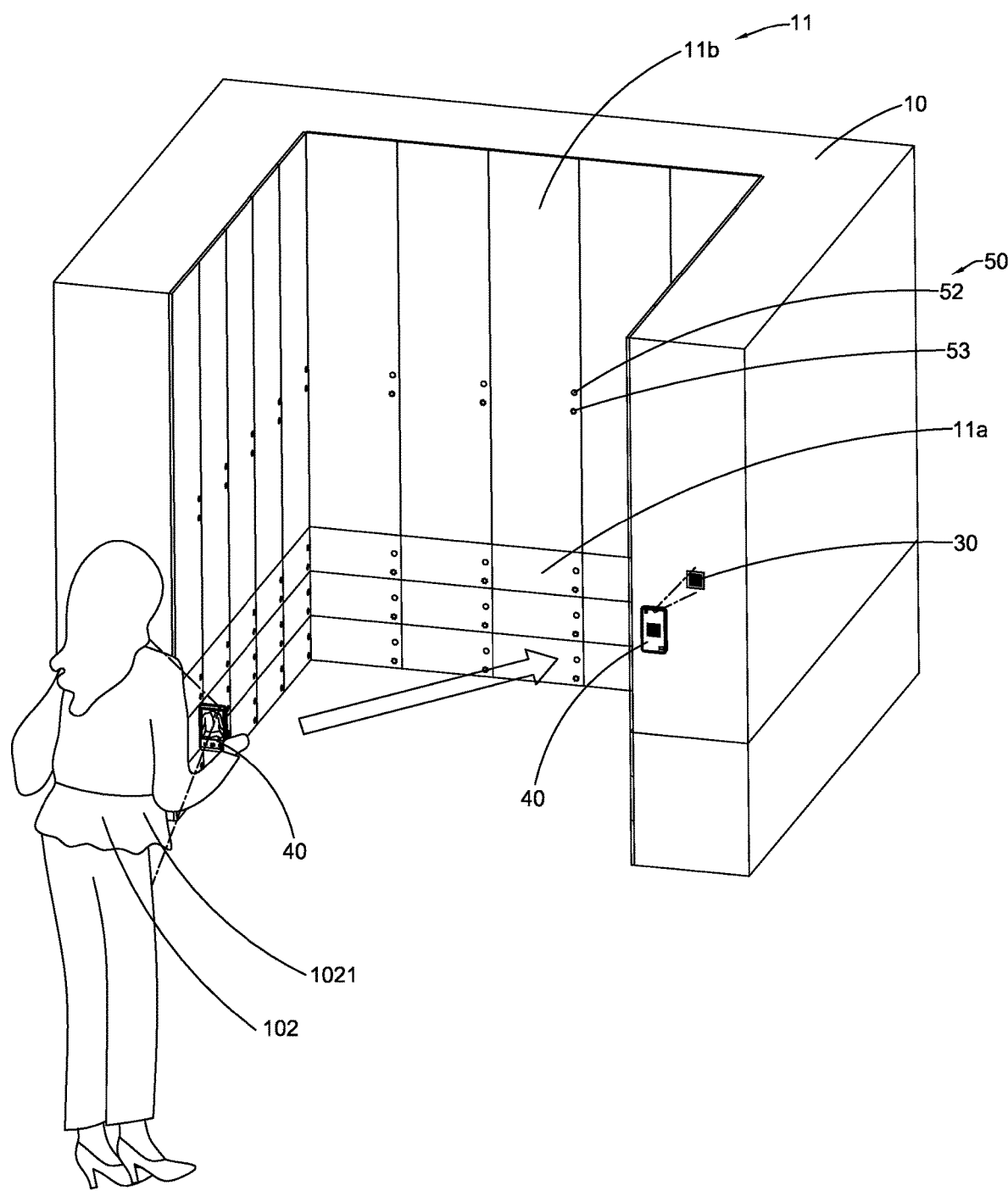
FIG. 5 is a schematic view illustrating a state for sheltering a clothing product on a shelter element of the system for home clothing and footwear products arrangement according to the above first preferred embodiment of the present invention.
Figure 6:
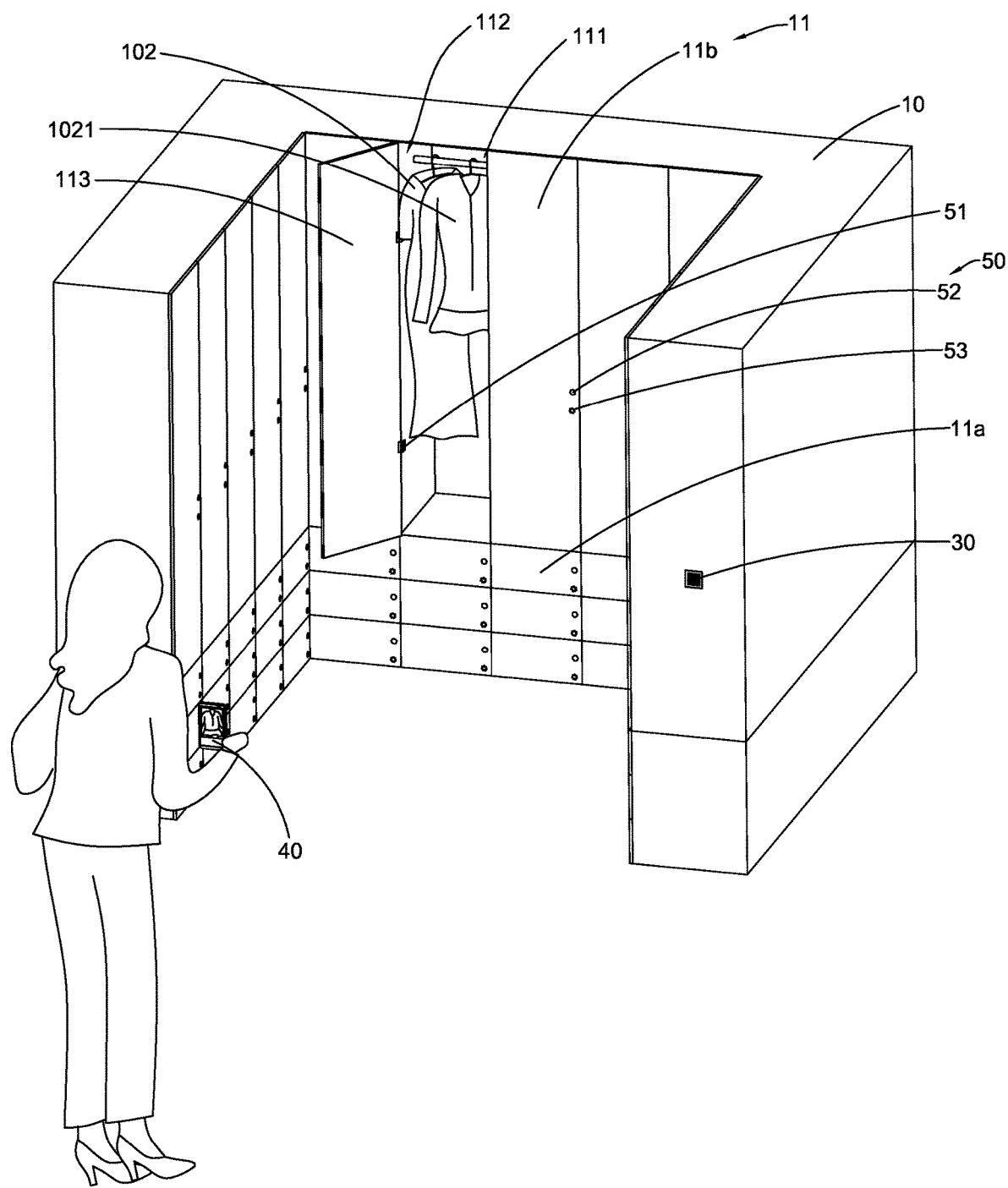
FIG. 6 is a schematic view illustrating a state for indicating a position of the clothing product on a shelter element of the system for home clothing and footwear products arrangement according to the above first preferred embodiment of the present invention.

FIGS. 5 and 6 illustrate a process for putting a target clothing product 1021 into a second shelter element 11b of the system for home clothing and footwear products arrangement and finding the target clothing product 1021 in the second shelter element 11b of the system when the user wants to wear the target clothing product 1021.

More specifically, similarly, as shown in FIG. 5, the electronic terminal 40 comprises the camera device 41 for taking a picture of the target clothing product 1021 to provide picture information 2231 of the item information 223, and then the user can scan the identifier 30 which is a graphic identification code 31 to activate and establish communication between the electronic terminal 40 and the control center 20 for the user to upload the picture information 2231 of the item information 223 of the target clothing product 1021 to the control center 20, and then the picture information 2231 of the item information 223 of the target clothing product 1021 is linked with the identity information 222 of the second shelter element 11b in the control center 20.

As shown in FIG. 6 of the drawings, when the user wants to find the target clothing product 1021, he or she can use the picture of the target clothing product 1021 which is the picture information 2231 of the item information 223 to search the target clothing product 1021 on the control center 20. The user can upload the picture of the target clothing product 1021 in a search toolbar of the software application to request for finding the target clothing product 1021.

Upon receiving the request from the electrical terminal 40, the control center 20 is in operation to indicate a position of the second shelter element 11b of the target clothing product 1021 based on the identity information 222 of the second shelter element 11b linked with the item information 223 of the target clothing product 1021 by activating the position indication arrangement 50 which comprises a plurality of the actuators 51, and each of the second shelter elements 11b is provided with an actuator 51 for opening the lid 113 of the corresponding second shelter element 11b which is arranged for storing the target clothing product 1021 which is the target product the user wants to find.

Similarly, each of the second shelter element 11b may be provided with a lighting indication element 52 that emits an indication lighting for indicating the position of the corresponding second shelter element 11b for storing the target clothing product 1021, or may be provided with a sound indicating element 53 that produces an indication sound for indicating the position of the corresponding second shelter element 11b for storing the target clothing product 1021. The user also may use sound message or text message to search the target clothing product 1021.

According to the instant invention, the clothing products 102 that are suitable for different seasons or of different brands, different styles and different sizes can be separately placed in different second shelter elements 11b, the footwear products 101 of different brands, different styles, different sizes can also be separately placed in different first shelter elements 11a, and the clothing products 102 and the footwear products 101 are easy to find for the user.

In particular, the electronic terminal 40 may be communicated to the control center 20 to retrieve a history sheltering information 224 of the corresponding first shelter element 11a that allows the user to view a utilization history of the first shelter element 11a. In other words, the user is able to know what footwear products that have ever been deposited in the corresponding first shelter element 11a.

Accordingly, some footwear products may have been worn for a long time, are not taken care of frequently, or footwear products that have been soaked in dirty water are not cleaned in time, and may exudes an unpleasant smell. It is not suitable for placing newly bought and clean pair of footwear products into the first shelter element 11*a* which has ever been used for storing the old and dirty footwear products, since it is easy to make the clean footwear products produce peculiar smells, or even cause diseases of the wearer's feet. However, dirty shoes and clean shoes can be placed separately by the system of the present invention. In addition, each first shelter element 11*a* can be provided with an independent deodorization and disinfection device, so that each first shelter element 11*a* can be deodorized, disinfected and sterilized.

In addition, the lid 113 of each shelter element 11 may be made of transparent material, so that the user is able to know which shelter element 11 is vacant before the user wants to place a dressing item into the shelter element 11.

Each of the lighting indication elements 52 may be further used to indicate whether the corresponding shelter element 11 is vacant or not. For instance, when a lighting indication element 52 provides a red light illumination, it means that the corresponding shelter element 11 is occupied, when the lighting indication element 52 provides a blue light illumination, it means that the corresponding shelter element 11 is vacant. When the lighting indication element 52 provides yellow flashing light illumination, it means that the target dressing item 100 is stored and sheltered in the corresponding shelter element 11.

The user may have a desired dressing set which comprises a target footwear product 1011 and a target clothing product 1021. In other words, when the user wears on the target footwear product 1011, he or she only wants to wear the target clothing product 1021 to collocate with the target footwear product 1011.

The camera device 41 of the electronic terminal 40 can be used for taking a picture of the target footwear product 1011 to provide picture information 2231 of the target footwear product 1011 and taking a picture of the target clothing product 1021 to provide picture information 2231 of the target clothing product 1021, and then the user can scan the identifier 30 which is a graphic identification code 31 to activate and establish communication between the electronic terminal 40 and the control center 20 for the user to upload the picture information 2231 of the item information 223 of the target footwear product 1011 and the target clothing product 1021 to the control center 20, and then the picture information 2231 of the item information 223 of the target footwear product 1011 and the target clothing product 1021 is linked with the identity information 222 of the first shelter element 11*a* as well as the identity information 222 of the second shelter element 11*b*.

After that, the target footwear product 1011 can be placed into the first shelter element 11*a* and the target clothing product 1021 can be placed into the second shelter element 11*b*. In addition, the position information of the first shelter element 11*a* for storing and sheltering the target footwear product 1011 and the position information of the second shelter element 11*b* for storing and sheltering the target clothing product 1021 is associated with each other.

Figure 7:
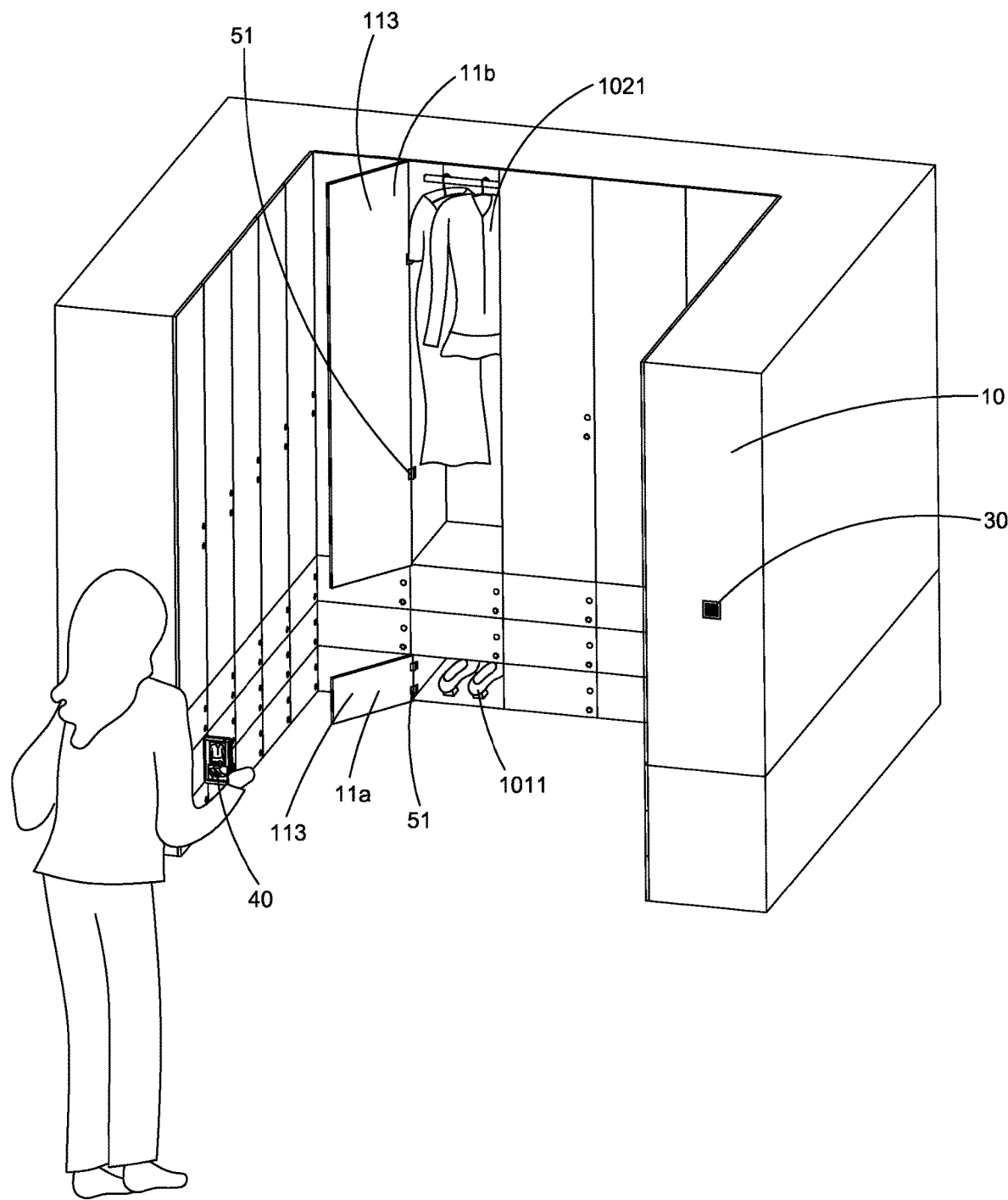
FIG. 7 is a schematic view illustrating a state for simultaneously indicating a position of the clothing product and a position of the footwear product by the system for home clothing and footwear products arrangement according to the above first preferred embodiment of the present invention.

Referring to FIG. 7 of the drawings, when the user wants to find the target footwear product 1011 and the target clothing product 1021, the user may use one of the picture information 2231 of the target footwear product 1011 and the picture information 2231 of the target clothing product 1021 for making a search request, the control center 20 will activate two actuators 51 to open lids 113 of the first shelter element 11*a* and the second shelter element 11*b*, so that the user is able to simultaneously find both of the target footwear product 1011 and the target clothing product 1021.

Figure 8A:
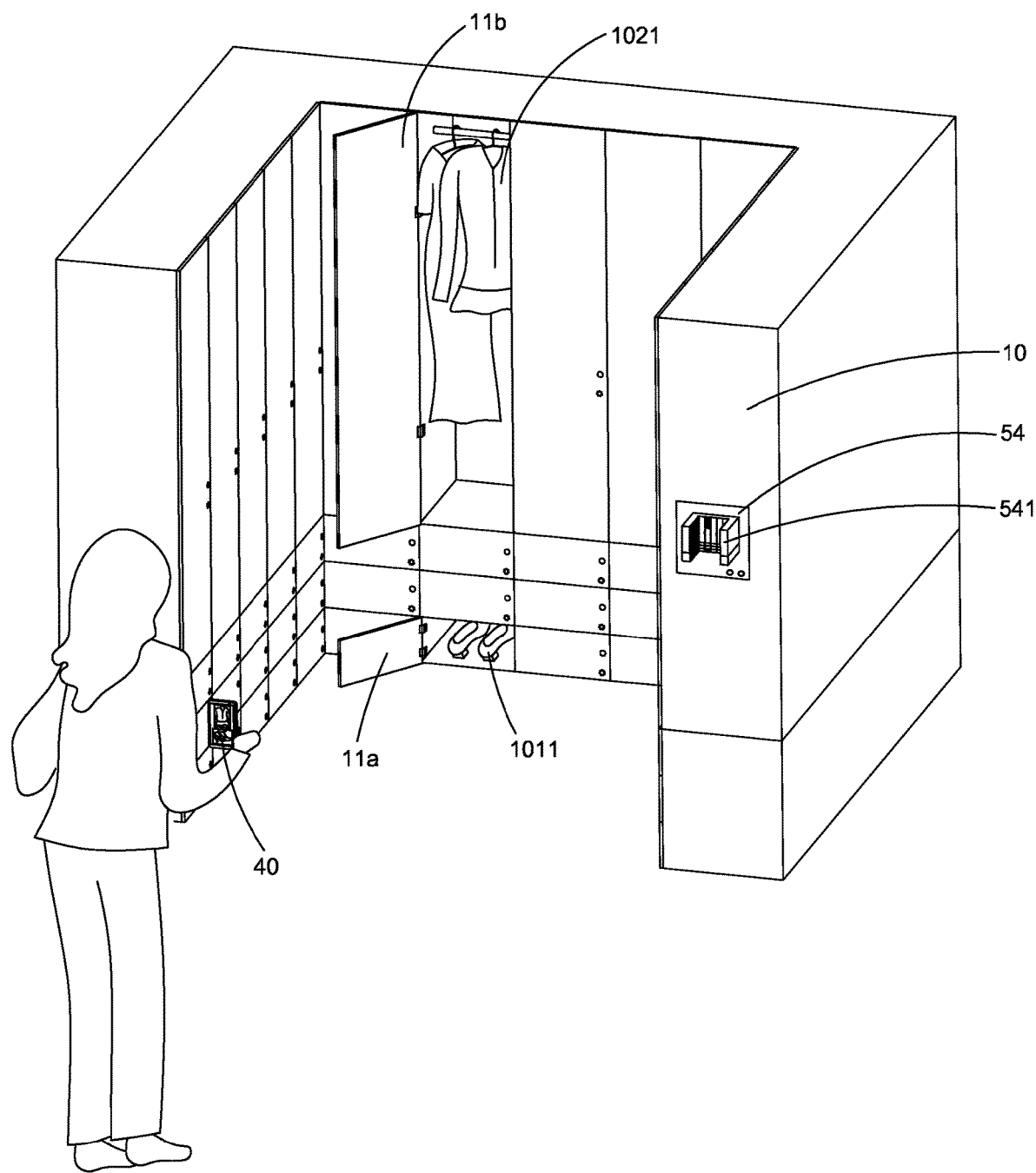
FIG. 8A is a schematic view illustrating a state for simultaneously indicating a position of the clothing product and a position of the footwear product by the system for home clothing and footwear products arrangement according to an alternative mode of the above first preferred embodiment of the present invention.

Referring to FIG. 8A of the drawings, as an alternative mode, the position indication arrangement 50 may further comprises a display 54 which is communicated to the control sensor 20 for displaying a visual shelter arrangement 541 so as to indicate the positions of the shelter elements 11. Alternatively, the display 54 is a display of the electrical terminal 40, and the visual shelter arrangement 541 is displayed on the display of the electrical terminal 40.

Figure 8B:
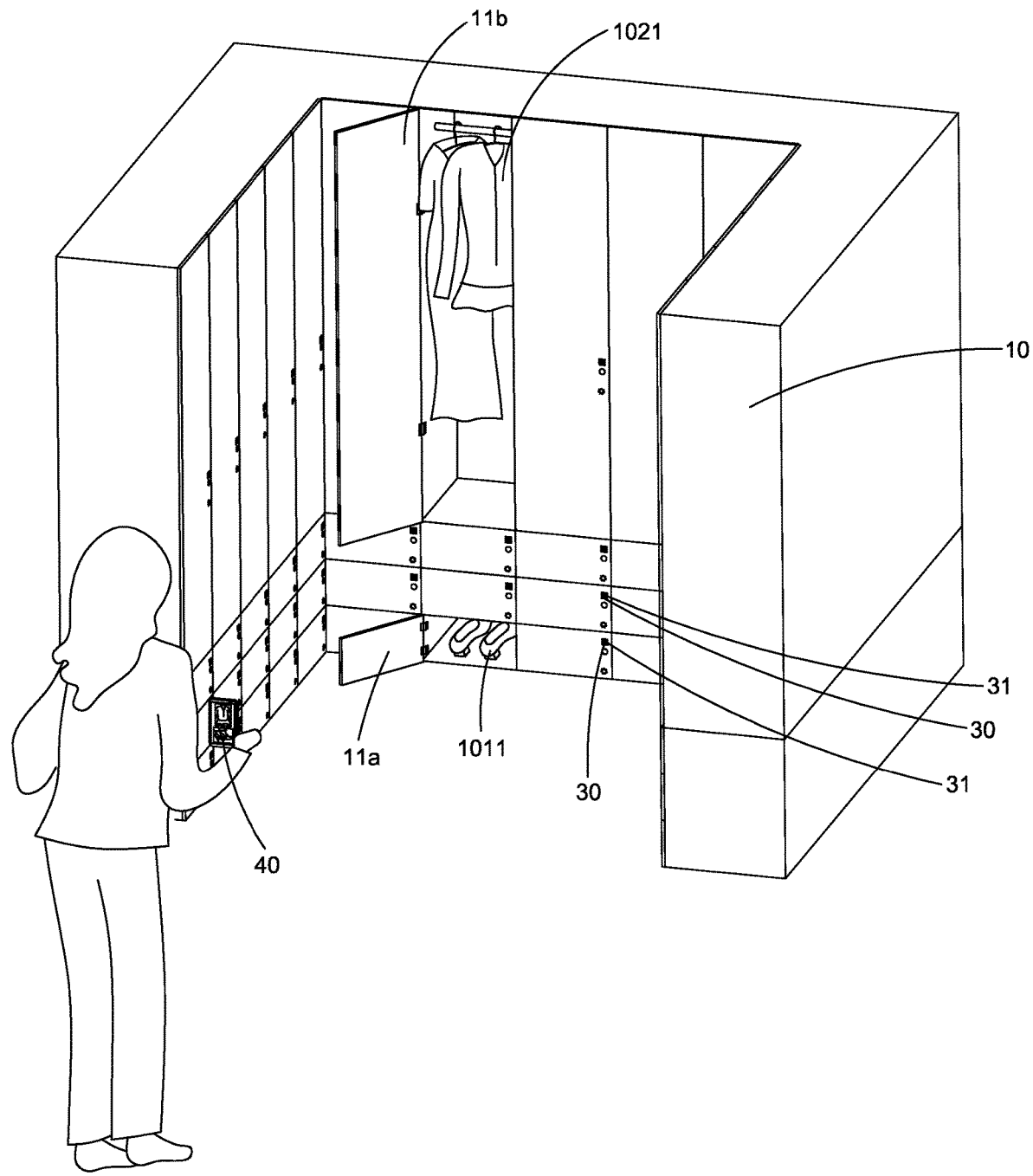
FIG. 8B is a perspective view of the system for home clothing and footwear products arrangement according to another alternative mode of the above first preferred embodiment of the present invention
Figure 9:
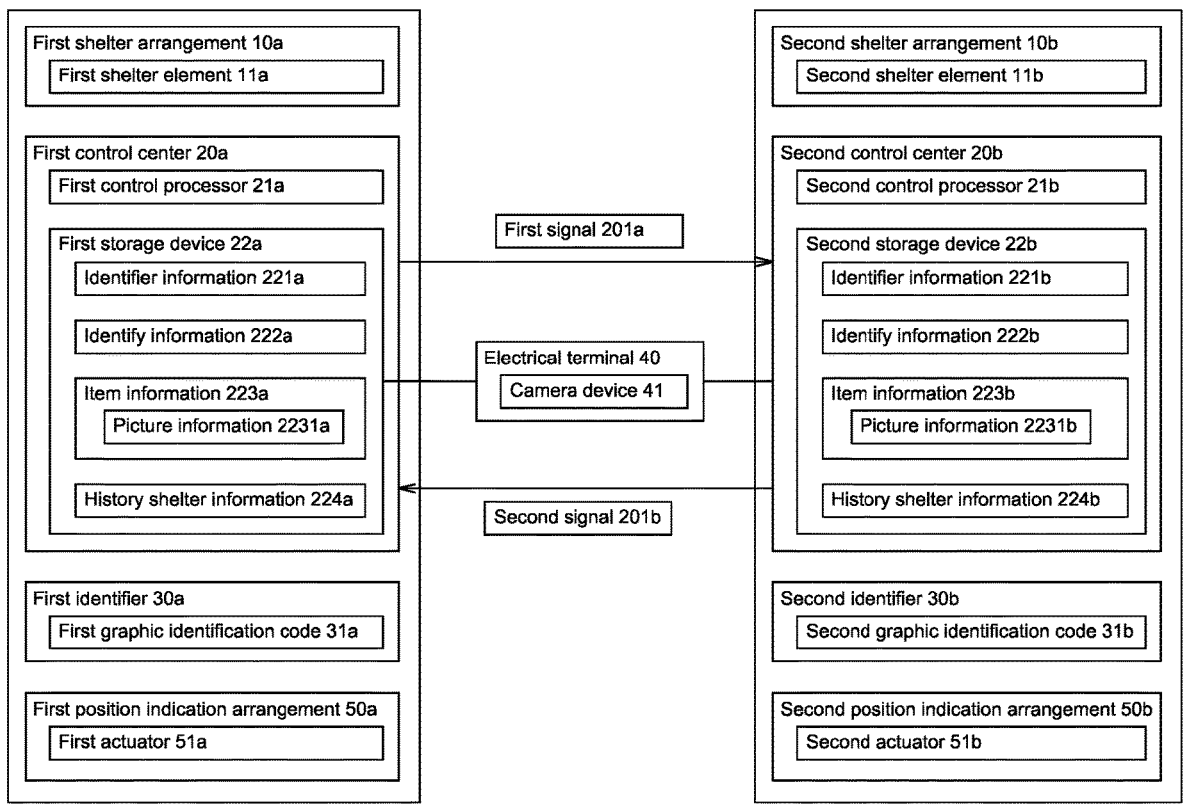
FIG. 9 is a diagram illustrating a system for home clothing and footwear products arrangement according to a second preferred embodiment of the present invention.

Referring to FIG. 8B of the drawings, as another alternative mode, each of the shelter element 11 may be provided with the identifier 30, so that when the user scan the graphic identification code 31 of the identifier 30 correspond to one shelter element 11 by the electronic terminal 40, the user is able to retrieve the history shelter information 224 corresponding to the shelter element 11, so as to help the user to decide whether he or she may put a new dressing object 100 into this shelter element 11.

Accordingly, the present invention provides a method of system for home clothing and footwear products arrangement, wherein the method comprises the following steps.

(a) provide a shelter arrangement which comprises a plurality of shelter elements 11 for sheltering a plurality of dressing items 100.

(b) provide an identifier 30 for establishing communication between an electrical terminal 40 and a control center 20 and receiving item information 223 of a target product which is one of a target footwear product 1011 and a target clothing product 1021 from the electrical terminal 40 by the control center 20.

(c) by the control center 20, link the item information 223 of the target product with identity information 222 of the shelter element 11 of the shelter arrangement 10 for sheltering the target product.

(d) In response to a request for searching the target product on the electrical terminal 40, indicate a position of the shelter element 11 for sheltering the dressing item 100 by a position indication arrangement 50 which is operatively communicated to the control center 20 based on the identity information 222 of the shelter element 11 linked with the item information 223 of the target product.

In the step (b), the user may scan a graphic identification code 31 of the identifier 30 by the electrical terminal 40 so as to communicate with the control center 20. A plurality of the graphic identification codes 31 of the identifiers 30 may be respectively provided on the plurality of shelter elements 11, and identifier information 221 of each identifier 30 is linked with the identity information 222 of the shelter element 11 and the item information 223 of the dressing item 100, so that the user may use the electrical terminal 40 to scan one of graphic identification code 31 to obtain history shelter information of the corresponding shelter element 11.

In the step (b), the item information 223 can be picture information 2231 obtained by a camera device 41 of the electrical terminal 40. In alternative modes, the item information 223 can be voice message or text message.

In the step (d), the user may input the item information 223 on the electrical terminal 40 to request for searching the dressing item 100. A lid 113 of the corresponding shelter element is driven by an actuator 51 to be opened to indicate the position of the shelter element 11 for sheltering the dressing item 100, or indication lighting is emitted by a lighting indication element 52 to indicate the position of the shelter element 11 for sheltering the dressing item 100, or indication sound is produced by a sound indication element 53 to indicate the position of the shelter element 11 for sheltering the dressing item 100.

In the step (c), item information 223 of the target footwear product 1011 and the target clothing product 1021 can be linked with the identity information 222 of a first shelter element 11a as well as the identity information 222 of a second shelter element 11b, so that in the step (d), when the user made request for searching one of the target footwear product 1011 and the target clothing product 1021 on the electrical terminal 40, both positions of the target footwear product 1011 and the target clothing product 1021 can be indicated by the position indication arrangement 50.

Referring to FIGS. 9 to 13 of the drawings, a system for home clothing and footwear products according to a second preferred embodiment of the present invention is illustrated. According to this embodiment, the system comprises a first shelter arrangement 10a which comprises a plurality of first shelter elements 11a for storing and sheltering a plurality of footwear products 101, and a second shelter arrangement 10b which comprises a plurality of second shelter elements 11b for storing and sheltering a plurality of clothing products 102, a first control center 20a corresponding to the first shelter arrangement 10a, a second control center 20b corresponding to the second shelter arrangement 10b, a first identifier 30a coupled to the first shelter arrangement 10a, a second identifier 30b coupled to the second shelter arrangement 10b, a first position indication arrangement 50a coupled to the first shelter arrangement 10a, a second position indication arrangement 50b coupled to the second shelter arrangement 10b.

According to this embodiment, the first shelter arrangement 10a and the second shelter arrangement 10b are independent from each other and are respectively arranged for sheltering the footwear products 101 and the clothing products 102. In other words, the first shelter arrangement 10a and the second shelter arrangement 10b can be arranged at different places of a house. For instance, the first shelter arrangement 10a for storing the footwear products 101 can be provided at an entrance of a house, and the second shelter arrangement 10b can be arranged in a bedroom of the house.

This embodiment of the present invention is able to help the user to find a target footwear product 1011 to match with a target clothing product 1021, or to find a target clothing product 1021 to match with a target footwear product 1011.

The first control center 20a and the second control center 20b are wirelessly connected to communicate between each other. The first control center 20a comprises a first control processor 21a, and a first storage device 22a. The second control center 20b comprises a second control processor 21b, and a second storage device 22b.

The first position indication arrangement 50a comprises a plurality of first actuators 51a coupled to the plurality of first shelter elements 11a of the first shelter arrangement 10a for indicating positions of the first shelter elements 11a respectively, the second position indication arrangement 50b comprises a plurality of second actuators 51b coupled to the plurality of second shelter elements 11b of the second shelter arrangement 10b for indicating positions of the second shelter elements 11a respectively.

FIGS. 10 to 13 illustrate a process for putting a target footwear product 1011 at a first shelter element 11a of and putting a target clothing product 1021 at a second shelter element 11b and finding the target footwear product 1011 in the first shelter element 11a and the target clothing product 1021 at the second shelter element 11b of the system when the user wants to wear the target footwear product 1011 and the target clothing product 1021.

Figure 10:
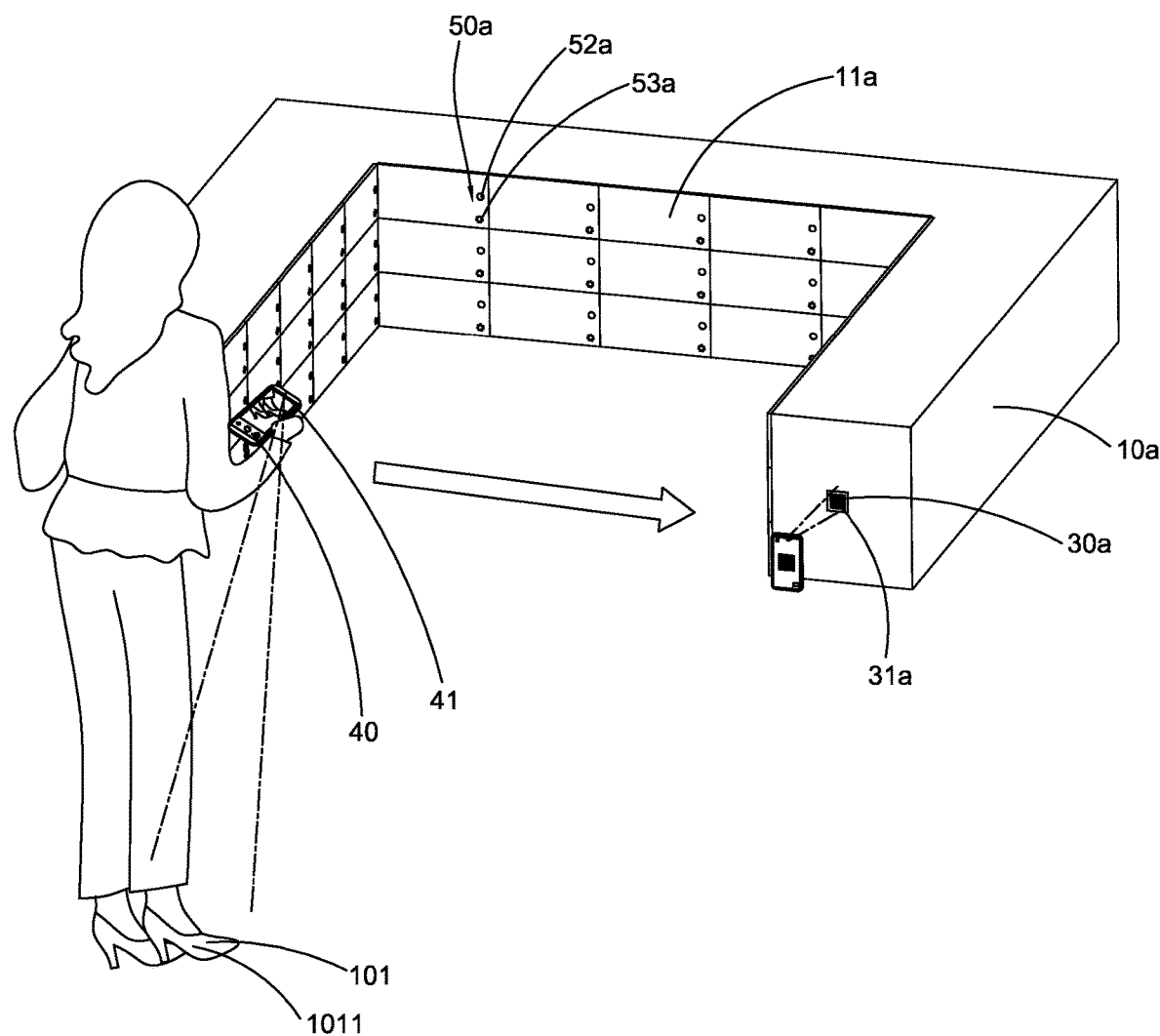
FIG. 10 is a schematic view illustrating a state for putting a footwear product into a first shelter arrangement of the system for home clothing and footwear products arrangement according to the above second preferred embodiment of the present invention.

More specifically, as shown in FIG. 10, the electronic terminal 40 comprises a camera device 41 for taking a picture of the target footwear product 1011 to provide picture information 2231a of item information 223a of the target footwear product 1011, and taking a picture of the target clothing product 1021 to provide picture information 2231b of item information 223b of the target clothing product 1021. The first storage device 22a is uploaded with identifier information 221a of the first identifier 30a, so that the user can scan the first identifier 30a which is a first graphic identification code 31a to activate and establish communication between the electronic terminal 40 and the first control center 20a for the user to upload the picture information 2231a of the item information 223a of the target footwear product 1011 and the picture information 2231b of the item information 223b of the target clothing product 1021 to the first control center 20a to associate the picture information 2231a of the item information 223a of the target footwear product 1011a and the picture information 2231b of the item information 223b of the target clothing product 1021 with identity information 222a of the first shelter element 11a by the first control center 20.

Figure 11:
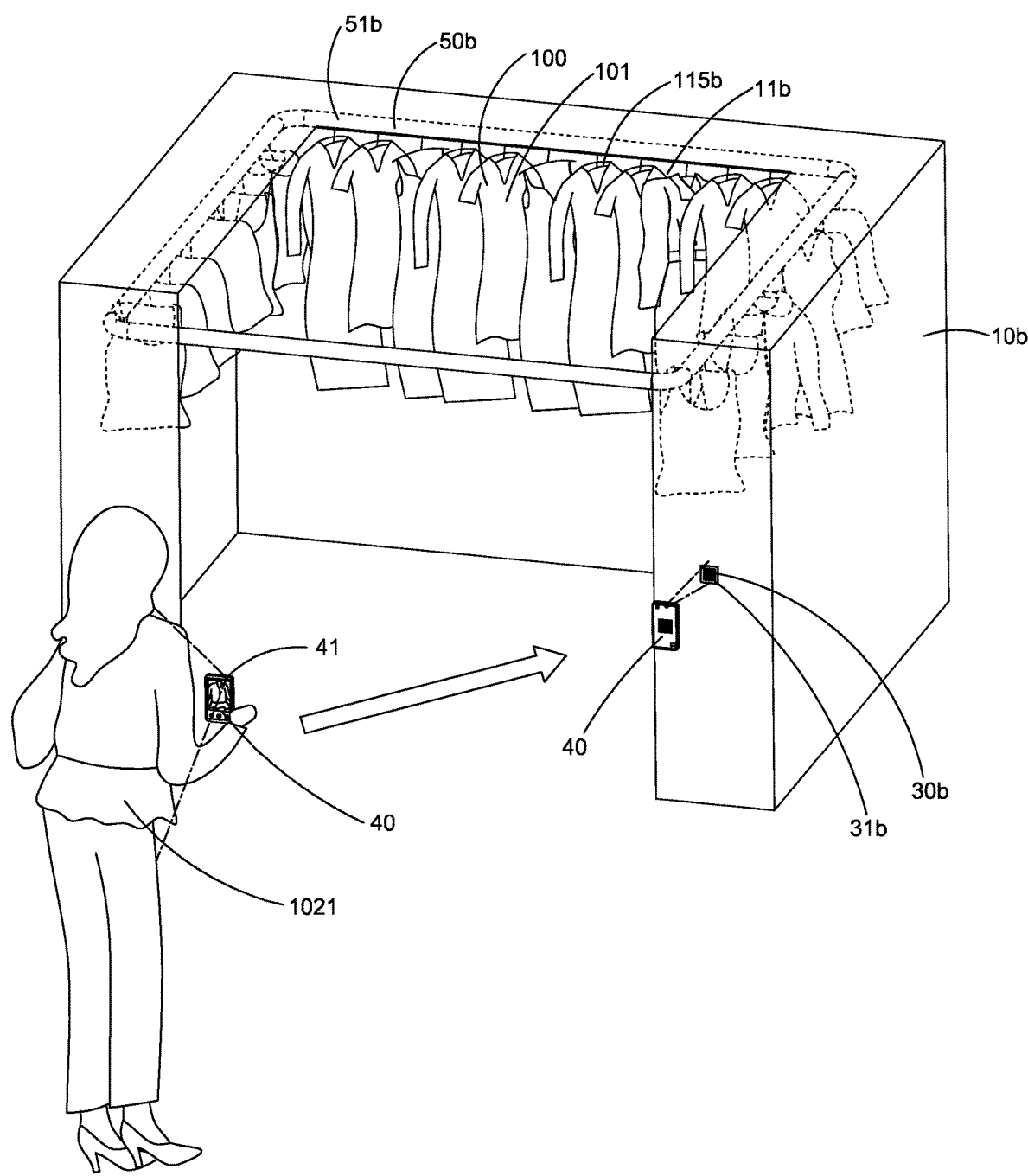
FIG. 11 is a schematic view illustrating a state for placing a clothing product at a second shelter arrangement of the system for home clothing and footwear products arrangement according to the above second preferred embodiment of the present invention

As shown in FIG. 11, the second storage device 22b is uploaded with identifier information 221b of the second identifier 30b the user can scan the second identifier 30a which is a second graphic identification code 31b to activate and establish communication between the electronic terminal 40 and the second control center 20b for the user to upload the picture information 2231a of the item information 223a of the target footwear product 1011 and the picture information 2231b of the item information 223b of the target clothing product 1021 to the second control center 20b to associate the picture information 2231a of the item information 223a of the target footwear product 1011 and the picture information 2231b of the item information 223b of the target clothing product 1021 with the identity information 222b of the second shelter element 11b by the second control center 20b.

When the user uses the item information 223a of the target footwear product 1011 to search the target footwear product 1011 on the electrical terminal 40 through a software application, the first control center 20a activates the first position indication arrangement 50a to indicate the position of the first shelter element 11a which is used for storing and sheltering the target footwear product 1011, and sends a first signal 201a from the first control center 20a to the second control center 20b based on linked item information 223b of the target clothing product 1021, item information 223a of the target footwear product 1011a and identity information 222a of the first shelter element 11a, so that the second control center 20b activates the second position indication arrangement 50b to indicate the position of the second shelter element 11b which is used for storing and sheltering the target clothing product 1021 based on the linked item information 223a of the target footwear product 1011, item information 223b of the target clothing product 1021 and the identity information 222b of the second shelter element 11b.

When the user uses the item information 223b of the target clothing product 1021 to search the target clothing product 1021 on the electrical terminal 40 through the software application, the second control center 20b activates the second position indication arrangement 50b to indicate the position of the second shelter element 11b which is used for storing and sheltering the target clothing product 1021, and sends a second signal 201b from the second control center 20b to the first control center 20a based on the linked item information 223a of the target footwear product 1011, item information 223b of the target clothing product 1021 and the identity information 222b of the second shelter element 11b, so that the first control center 20a activates the first position indication arrangement 50a to indicate the position of the first shelter element 11a which is used for storing and sheltering the target footwear product 1011 based on the linked item information 223b of the target clothing product 1021, item information 223a of the target footwear product 1011a and identity information 222a of the first shelter element 11a.

In other words, when a user goes to the first shelter arrangement 10a at a first place in the house to find the target footwear product 1011 to wear on, the second position indication arrangement 50b is actuated to indicate the position of the target clothing product 1021, so that when the user wears on the target footwear product 1011 and walks to second shelter arrangement 10b at a second place of the house, the target clothing product 1021 is identified and ready for the user to wear on, so that the user is not required to spend time for finding the target clothing product 1021.

Similarly, when the user goes to the second shelter arrangement 10b at the second place in the house to find the target clothing product 1021 to wear on, the first position indication arrangement 50a is actuated to indicate the position of the target footwear product 1021, so that when the user wears on the target clothing product 1021 and walks to first shelter arrangement 10a at the first place of the house, the target footwear product 1011 is identified and ready for the user to wear on, so that the user is not required to spend time for finding the target footwear product 1011.

According to this embodiment, each of the first shelter elements 11a comprises a drawer 114a, the first actuator 51a of the first position indication arrangement 50a is arranged for moving the drawer 114a to expose the target footwear product 1011 stored in the drawer 114a. Each second shelter element 11b comprises a hook element 115b for hanging the corresponding clothing product 102, the second actuator 51b of the second position indication arrangement 50b is arranged for moving the hook element 115b to transfer the target clothing product 1021 to a position ready for a user to pick up and wear on. For instance, the second actuator 51b is a movable rack that is operatively to be activated to move, so as to guide the hook element 115b which is sheltered with the target clothing product 1021 to move.

Alternatively, when the user is able to memorize the position of the first shelter element 11a for storing the target footwear product 1011, he or she may directly goes to the first shelter element 114a to take out the target footwear product 1011, in response to moving the drawer 11a by the first actuator 51a to demonstrate the target footwear product 1011, the first control center 20a sends a signal to the second control center 20b to activates the second position indication arrangement 50b to indicate the position of the second shelter element 11b which is used for storing and sheltering the target clothing product 1021.

Similarly, when the user is able to memorize the position of the second shelter element 11b for storing the target clothing product 1021, he or she may directly goes to the second shelter element 11b to pick up the target clothing product 1011, in response to moving the hook element 115b by the second actuator 51b to demonstrate the target clothing product 1021, the second control center 20b sends a signal to the first control center 20a to activate the first position indication arrangement 50a to indicate the position of the first shelter element 11a which is used for storing and sheltering the target footwear product 1011.

In addition, the user can retrieve the history shelter information 224a of the first shelter element 11a from the first control center 10a so that the user is able to know what footwear products have been stored at the first shelter element 11a. The user can retrieve the history shelter information 224b of the second shelter element 11b from the second control center 10b so that the user is able to know what clothing products have been stored at the second shelter element 11b.

Figure 12:
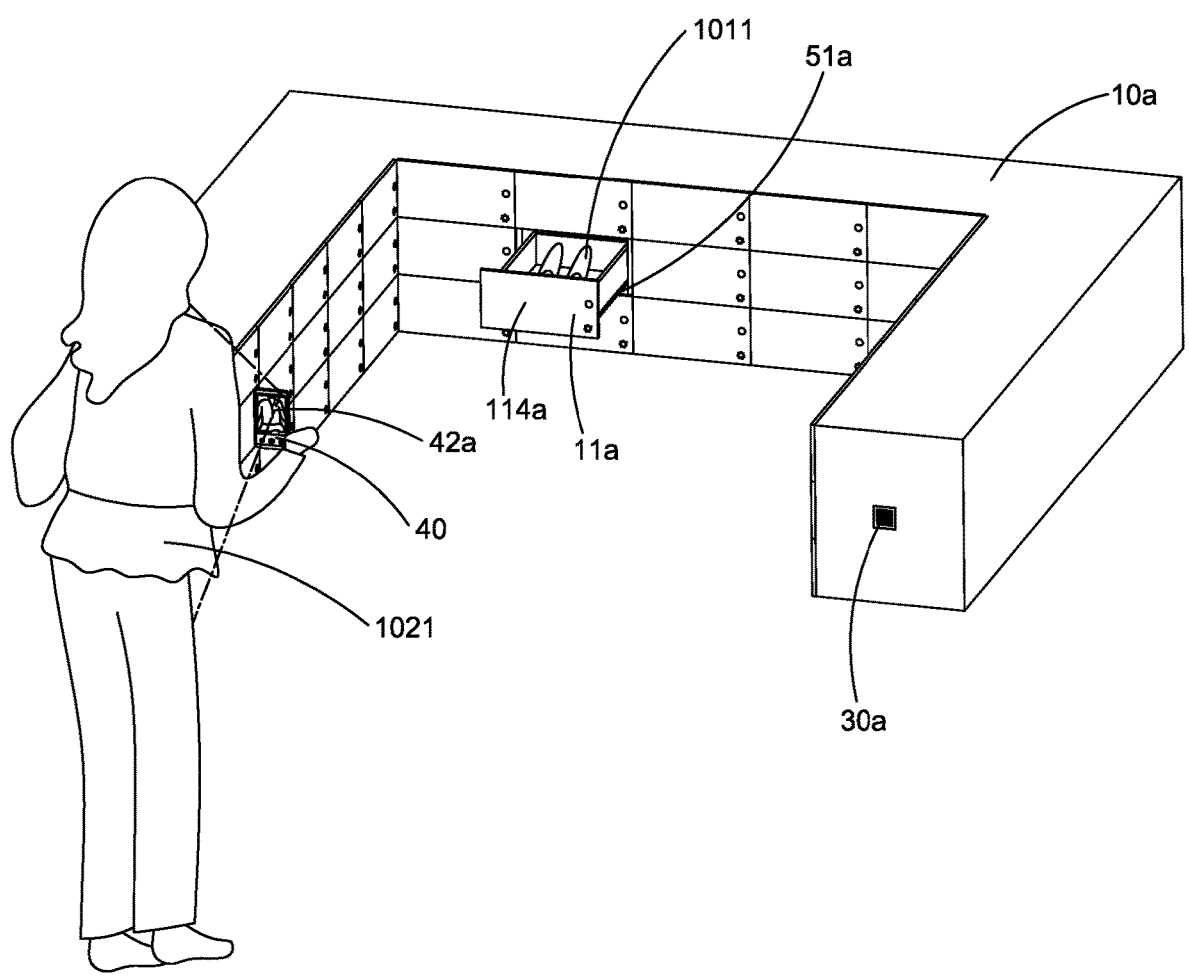
FIG. 12 is a schematic view illustrating a state for indicating a position of the footwear product in a first shelter element of the system for home clothing and footwear products arrangement upon identifying the clothing product by an electrical terminal according to the above second preferred embodiment of the present invention.

Referring to FIG. 12 of the drawings, when the user wants to find the target footwear product 1011, he or she may use the camera device 41 of the electrical terminal 40 to capture the target clothing product 1021 which has been worn on the user to generate a clothing identification picture 42a, and then the clothing identification picture 42a can be sent to the first control center 20a, and when the information of the target clothing product 1021 in the clothing identification picture 42a matched with the picture information 2231b of the item information 223b of the target clothing product 1021 stored in the first control center 20a, the first control center 20a is in operation to activate the first position indication arrangement 50a to indicate a position of the first shelter element 11a of the target footwear product 1011 based on the linked item information 223b of the target clothing product 1021, item information 223a of the target footwear product 1011a and identity information 222a of the first shelter element 11a.

Figure 13:
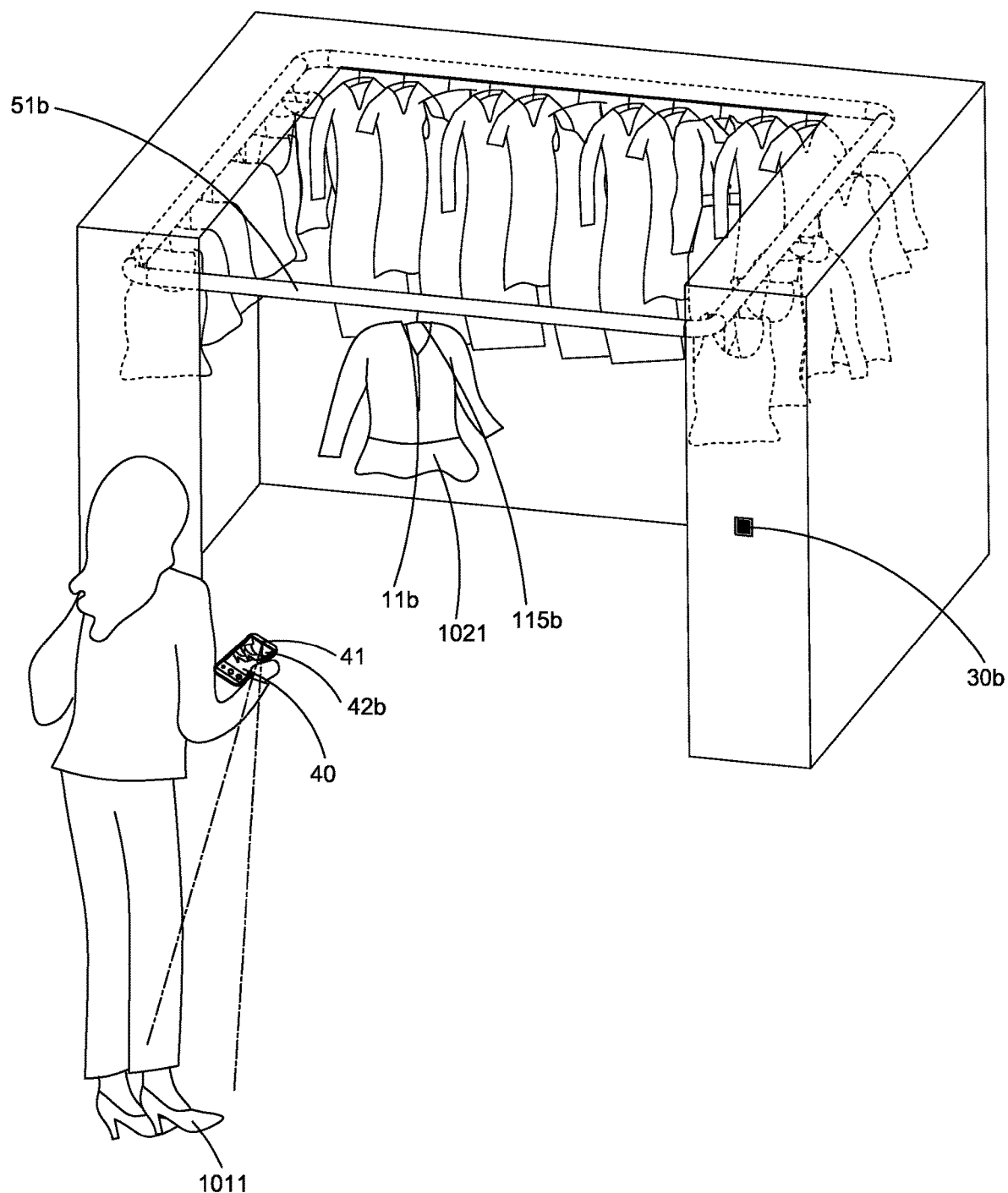
FIG. 13 is a schematic view illustrating a state for indicating a position of the clothing product on a second shelter element of the system for home clothing and footwear products arrangement upon identifying the footwear product by an electrical terminal according to the above second preferred embodiment of the present invention.

Referring to FIG. 13 of the drawings, when the user wants to find the target clothing product 1021, he or she may use the camera device 41 of the electrical terminal 40 to capture the target footwear product 1011 which has been worn on the user to generate a footwear identification picture 42b, and then the footwear identification picture 42b can be sent to the second control center 20b, and when the information of the target footwear product 1011 in the footwear identification picture 42b matched with the picture information 2231a of the item information 223a of the target footwear product 1011 stored in the second control center 20b, the second control center 20b is in operation to activate the second position indication arrangement 50b to indicate a position of the second shelter element 11b of the target clothing product 1021 based on the linked item information 223a of the target footwear product 1011, item information 223b of the target clothing product 1021 and the identity information 222b of the second shelter element 11b.

Alternatively, each of the first and second control centers 20a and 20b may also comprises a camera unit for obtaining the clothing identification picture 42a and the footwear identification picture 42b respectively.

Accordingly, the present invention provides a method of a system of home clothing and footwear products, wherein the method comprises the following steps.

(A) Provide a first shelter arrangement 10a which comprises a plurality of first shelter elements 11a for sheltering a plurality of footwear products 101, and provide a second shelter arrangement 10b which comprises a plurality of second shelter elements 11b for sheltering a plurality of clothing products 102, wherein the first shelter arrangement 10a and the second shelter arrangement 10b are independent with each other.

(B) provide a first identifier 30a for establishing communication between an electrical terminal 40 and a first control center 20a and receiving item information 223a of a target footwear product 1011 and item information 223b of a target clothing product 1021 from the electrical terminal 40 by the first control center 20a.

(C) by the first control center 20, link the item information 223a of the target footwear product 1011 and the item information 223b of the target clothing product 1021 with identity information 222a of a first shelter element 11a of a first shelter arrangement 10a for sheltering the target footwear product 1011.

(D) provide a second identifier 30b for establishing communication between the electrical terminal 40 and a second control center 20b and receiving the item information 223a of the target footwear product 1011 and the item information 223b of the target clothing product 1021 from the electrical terminal 40 by the second control center 20b.

(E) by the second control center 20b, link the item information 223a of the target footwear product 1011 and the item information 223b of the target clothing product 1021 with identity information 222b of a second shelter element 11b of a second shelter arrangement 10b for sheltering the target clothing product 1021.

(F) indicate a position of the first shelter element 11a by a first position indication arrangement 50a which is operatively communicated to the first control center 20a based on the identity information 222a of the first shelter element 11a linked with the item information 223a of the target footwear product 1011 and the item information 223b of the target clothing product 1021.

(G) indicate a position of the second shelter element 11b by a second position indication arrangement 50b which is operatively communicated to the second control center 20b based on the identity information 222b of the second shelter element 11b linked with the item information 223a of the target footwear product 1011 and the item information 223b of the target clothing product 1021.

In the step (F), the first control center 20a may be sent with a second signal 201b from the second control center 20b, and the first control center 20a activates the first position indication arrangement 50a. In the step (G), the second control center 20b may be sent with a first signal 201a from the first control center 20a, and the second control center 20b activates the second position indication arrangement 50b.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A method of a system for home clothing and footwear products arrangement, wherein the method comprises the following steps:
    (A) providing a first shelter arrangement which comprises a plurality of first shelter elements for sheltering a plurality of footwear products, and providing a second shelter arrangement which comprises a plurality of second shelter elements for sheltering a plurality of clothing products, wherein the first shelter arrangement and the second shelter arrangement are independent with each other;
    (B) providing a first identifier for establishing communication between an electrical terminal and a first control center which is a computing device, and by the first control center, receiving item information of a target footwear product and item information of a target clothing product from the electrical terminal;
    (C) by the first control center, linking the item information of the target footwear product and the item information of the target clothing product with identity information of a first shelter element of the first shelter arrangement for sheltering the target footwear product;
    (D) providing a second identifier for establishing communication between the electrical terminal and a second control center which is a computing device, and by the second control center, receiving the item information of the target footwear product and the item information of the target clothing product from the electrical terminal;
    (E) by the second control center, linking the item information of the target footwear product and the item information of the target clothing product with identity information of a second shelter element of the second shelter arrangement for sheltering the target clothing product;
    (F) indicating a position of the first shelter element by a first position indication arrangement which is operatively communicated to the first control center based on the identity information of the first shelter element linked with the item information of the target footwear product and the item information of the target clothing product; and
    (G) indicating a position of the second shelter element by a second position indication arrangement which is operatively communicated to the second control center based on the identity information of the second shelter element linked with the item information of the target footwear product and the item information of the target clothing product.

2. The method, as recited in claim 1, wherein the step (F) comprises the steps of:
    (F.1) in response to a request for searching the target clothing product on the electrical terminal, indicating the position of the second shelter element by the second position indication arrangement, and sending a second signal from the second control center to the first control center; and
    (F.2) based on the second signal, activating the first position indication arrangement by the first control center to indicate the position of the first shelter element by the first position indication arrangement.

3. The method, as recited in claim 1, wherein the step (G) comprises the steps of:
    (G.1) in response to a request for searching the target footwear product on the electrical terminal, indicating the position of the first shelter element by the first position indication arrangement, and sending a first signal from the first control center to the second control center; and
    (G.2) based on the first signal, activating the second position indication arrangement by the second control center to indicate the position of the second shelter element by the second position indication arrangement.

4. The method, as recited in claim 2, wherein the step (G) comprises the steps of:
    (G.1) in response to a request for searching the target footwear product on the electrical terminal, indicating the position of the first shelter element by the first position indication arrangement, and sending a first signal from the first control center to the second control center; and (G.2) based on the first signal, activating the second position indication arrangement by the second control center to indicate the position of the second shelter element by the second position indication arrangement.

5. The method, as recited in claim 1, wherein the step (F) comprises the steps of:
(F.3) in response to activation of the second position indication arrangement for indicating the position of the second shelter element, sending a second signal from the second control center to the first control center; and
(F.4) based on the second signal, activating the first position indication arrangement by the first control center to indicate the position of the first shelter element by the first position indication arrangement.

6. The method, as recited in claim 1, wherein the step (G) comprises the steps of:
(G.3) in response to activation of the first position indication arrangement for indicating the position of the first shelter element, sending a first signal from the first control center to the second control center; and
(G.4) based on the first signal, activating the second position indication arrangement by the second control center to indicate the position of the second shelter element by the second position indication arrangement.

7. The method, as recited in claim 1, wherein the step (F) comprises the steps of determining that a clothing identification picture, which is obtained by the electrical terminal, is matched with the item information of the target clothing product stored in the first control center, and indicating the position of the first shelter element for sheltering the target footwear product by the first position indication arrangement.

8. The method, as recited in claim 1, wherein the step (G) comprises the steps of determining that a footwear identification picture, which is obtained by the electrical terminal, is matched with the item information of the target footwear product stored in the second control center, and indicating the position of the second shelter element for sheltering the target clothing product by the second position indication arrangement.

9. The method, as recited in claim 2, wherein the step (F) of indicating the position of the first shelter element by the first position indication arrangement comprises a step selected from the group consisting of:
(F1) opening a lid of the first shelter element by an actuator of the first position indication arrangement;
(F2) moving a drawer of the first shelter element by an actuator of the first position indication arrangement to expose the target footwear product;
(F3) emitting an indication lighting by a lighting indication element of the first position indication arrangement provided on the first shelter element; and
(F4) producing an indication sound by a sound indication element of the first position indication arrangement provided on the first shelter element.

10. The method, as recited in claim 3, wherein the step (G) of indicating the position of the first shelter element by the first position indication arrangement comprises a step selected from the group consisting of:
(G1) opening a lid of the second shelter element by an actuator of the second position indication arrangement;
(G2) moving a hook element of the second shelter element by an actuator of the second position indication arrangement for demonstrating the target clothing product;
(G3) emitting an indication lighting by a lighting indication element of the second position indication arrangement provided on the second shelter element; and
(G4) producing an indication sound by a sound indication element of the second position indication arrangement provided on the second shelter element.

11. A method of a system for home clothing and footwear products arrangement, wherein the method comprises the following steps:
(a) providing a shelter arrangement which comprises a plurality of shelter elements for sheltering a plurality of dressing items, wherein each of the plurality of dressing items is one of a clothing product and a footwear product;
(b) providing an identifier for establishing communication between an electrical terminal and a control center which is a computing device, and by the control center, receiving item information of a target product which is one of a target footwear product and a target clothing product from the electrical terminal;
(c) by the control center, linking the item information of the target product with identity information of the shelter element for sheltering the target product;
(d) in response to a request for searching the target product on the electrical terminal, indicating a position of the shelter element for sheltering the target product by a position indication arrangement which is operatively communicated to the control center based on the identity information of the shelter element for sheltering the target product linked with the item information of the target product; and
(e) linking the item information of the target footwear product and the item information of the target clothing product with identity information of a first shelter element for sheltering the target footwear product and identity information of a second shelter element for sheltering the target clothing product, wherein in the step (d), in response to a request for searching one of the target footwear product and the target clothing product on the electrical terminal, both positions of the first shelter element for sheltering the target footwear product and the second shelter element for sheltering the target clothing product are indicated by the position indication arrangement.

12. The method, as recited in claim 11, wherein the identifier comprises a graphic identification code for the electrical terminal to scan for establishing communication between the control center and the electrical terminal, wherein the item information of the target product is picture information of the target product which is obtained by a camera device of the electrical terminal.

13. The method, as recited in claim 12, wherein when one of picture information of the target footwear product and picture information of the target clothing product, which is stored in the electrical terminal, is reused in the step (d) for implementing the request for searching the target product on the electrical terminal, both positions of the first shelter element for sheltering the target footwear product and the second shelter element for sheltering the target clothing product are indicated by the position indication arrangement.

* * * * *